United States Patent

Campbell et al.

[11] Patent Number: 5,707,110
[45] Date of Patent: Jan. 13, 1998

[54] POSITION MARKING ARRANGEMENT

[75] Inventors: Alan Campbell, Stock; Malcolm Russell, Upminster, both of United Kingdom

[73] Assignee: Ford Global Technologies, Inc., Dearborn, Mich.

[21] Appl. No.: 694,725

[22] Filed: Aug. 9, 1996

[30] Foreign Application Priority Data

Aug. 4, 1995 [GB] United Kingdom ............... 9516042

[51] Int. Cl.$^6$ ............................................. A47C 1/02
[52] U.S. Cl. ................................. 297/344.1; 116/283
[58] Field of Search ...................... 297/463.1, 463.2, 297/217.2, 344.1, 337; 40/320, 622; 248/429; 116/306, 307, 283, 281; 296/65.1

[56] References Cited

U.S. PATENT DOCUMENTS

| | | | |
|---|---|---|---|
| 1,564,339 | 12/1925 | Fraser et al. | 297/217.2 X |
| 1,736,503 | 11/1929 | Marshall | 297/344.1 |
| 2,019,159 | 10/1935 | Saunders | 297/344.1 X |
| 2,299,597 | 10/1942 | Schilling | 116/325 X |
| 2,609,034 | 9/1952 | Barecki | 297/344.1 X |
| 2,771,124 | 11/1956 | Borsani | 297/337 X |
| 3,841,260 | 10/1974 | Sharp et al. | 116/325 |
| 4,763,952 | 8/1988 | Gaudreau, Jr. | 297/217.2 |
| 4,881,774 | 11/1989 | Bradley et al. | 297/344.1 |
| 5,058,283 | 10/1991 | Wise et al. | |

FOREIGN PATENT DOCUMENTS

| | | | |
|---|---|---|---|
| 0043242 | 1/1982 | European Pat. Off. | |
| 0158607 | 10/1985 | European Pat. Off. | |
| 359006138 | 1/1984 | Japan | 297/463.2 |
| 359006141 | 1/1984 | Japan | 297/463.2 |
| 359023740 | 2/1984 | Japan | 297/463.2 |
| 288065 | 4/1928 | United Kingdom | 248/429 |
| WO87/00738 | 2/1987 | WIPO | |

Primary Examiner—Milton Nelson, Jr.
Attorney, Agent, or Firm—Daniel M. Stock

[57] ABSTRACT

A position marking arrangement for a slidable vehicle seat 10, 12. The seat includes a first component 18 which is slidable relative to a fixed, second component 16. The seat component 18 has a datum mark 24 thereon and the fixed seat slide 16 has a surface 22 such that relative movement takes place between the datum mark and the surface when the seat slides. The surface has holes 28 for mounting thereon a marker 30 in a range of different positions, and the seat can be moved to any one of the different positions, with the positions being marked by one or more markers 30.

4 Claims, 1 Drawing Sheet

U.S. Patent  Jan. 13, 1998  5,707,110
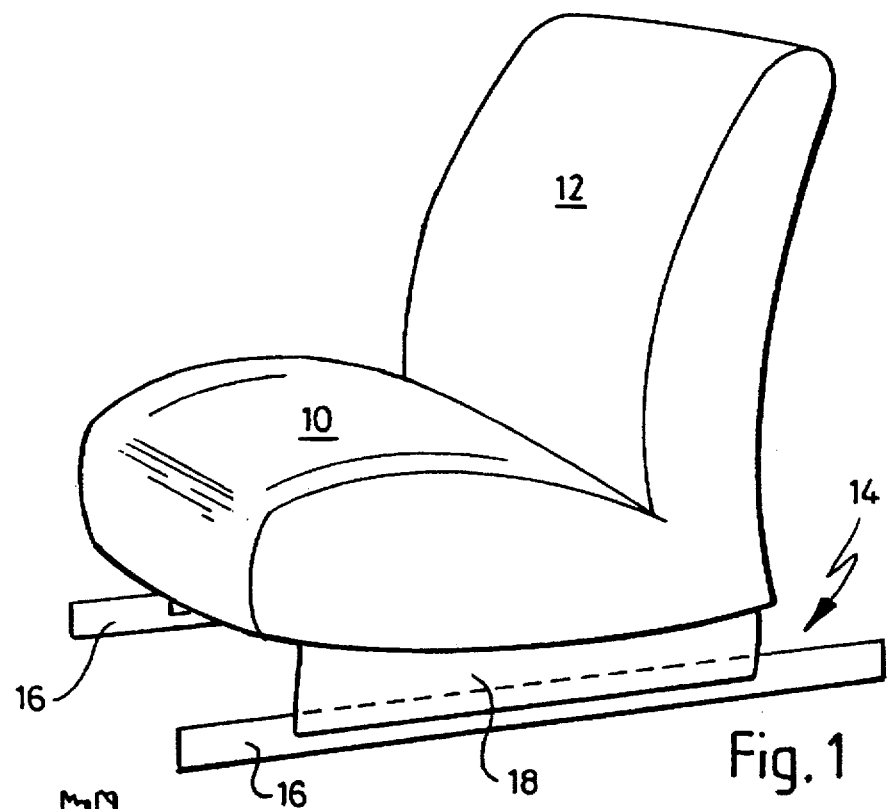
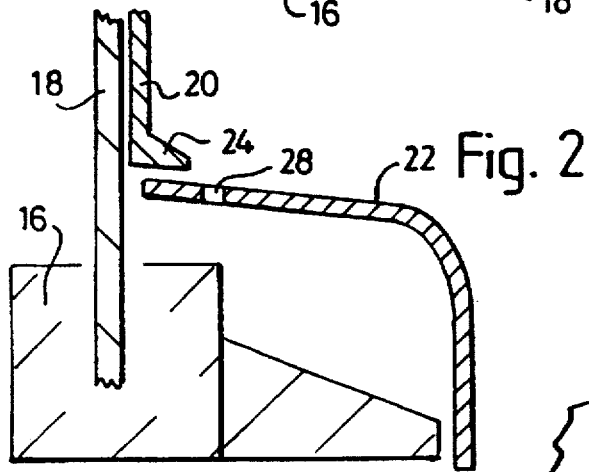
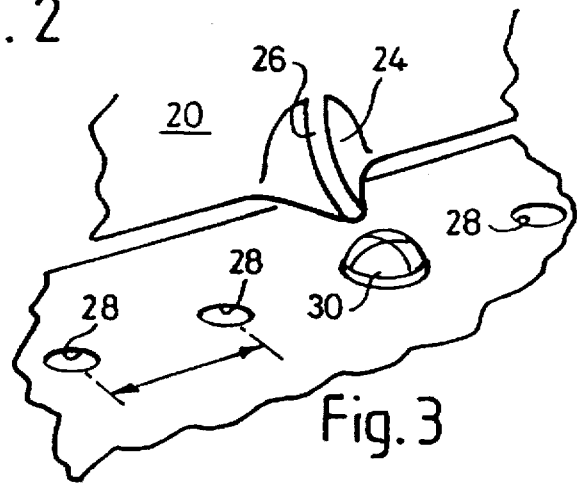
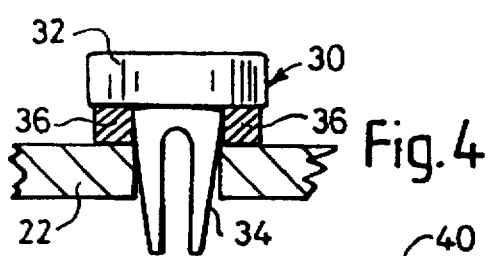
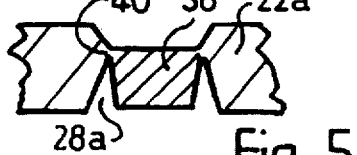
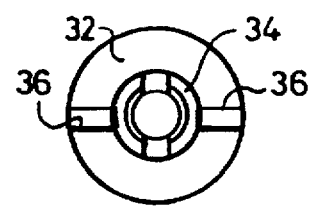

POSITION MARKING ARRANGEMENT

BACKGROUND OF THE INVENTION

1. Technical Field

This invention relates to a position marking arrangement for marking the position of a slidable vehicle seat.

2. Discussion of Prior Art

It is often the case that a vehicle has a number of different drivers, all of whom wish to place a slidable driver seat in a particular position which is most comfortable for them. However, when the next driver drives the vehicle, the seat is adjusted to a different position and the first driver has to reestablish once more their most comfortable position on the next occasion when they drive the vehicle.

It is known to provide an electronic "memory" which will adjust the seat to a memorized setting when a driver enters a code. One such system is described in EP 0158607. However, such arrangements are expensive to install.

It is also known to provide a numerical scale positioned alongside the seat, and the idea here is that each driver remembers the number on the scale corresponding to their preferred position and then resets the seat to that position. However, this does require each driver to memorize a scale setting, and this can be difficult to do. Such an arrangement is described, for example, in DE-OS-2558604.

SUMMARY OF THE INVENTION

According to the present invention, there is provided a position marking arrangement for a slidable vehicle seat, in which the seat forms a first component which is slidable relative to a fixed, second component, wherein either the first or the second component has a datum mark thereon, and the other of the components has a surface such that relative movement takes place between the datum mark and the surface when the seat slides, and wherein the surface has means for mounting thereon a marker in a range of different positions.

In a preferred form of the invention, markers in the form of differently colored pegs are provided, and these markers can be inserted into appropriate ones of a series of holes in the said surface.

With this system, all drivers find their most comfortable position by sliding the vehicle seat backward and/or forward to one of the latched positions allowed by the latch mechanism. When the most comfortable position is found, a marker peg is inserted opposite the datum mark, and then that driver only has to remember that their peg is, for example, the red peg, and that they must adjust the seat on the next occasion they drive so that the datum mark lines up with the red peg. The positions where marker pegs can be mounted are aligned with the latched positions provided by the seat latch mechanism.

It is easier to remember a color than a number, and, furthermore, the marker pegs could be customized by writing each driver's initials on the top of the peg. It is also easier to subsequently adjust the seat to a position defined by a brightly colored peg than it is to find a particular position on a numerical scale.

Preferably, the datum mark is on the slidable seat and the surface which carries the marker mounting means is on the fixed, second component. The surface may be part of a shroud which conceals the stationary element of the vehicle seat slide mechanism.

The use of colored pegs in holes is not the only marking method which falls within the scope of this invention.

For example, there may be colored slides which slide along a track and which can be fixed at one position on the track.

BRIEF DESCRIPTION OF THE DRAWINGS

The invention will now be further described, by way of example, with reference to the accompanying drawings, in which:

FIG. 1 is perspective view of a vehicle seat slide arrangement in accordance with the prior art;

FIG. 2 is a cross-section through a vehicle seat slide mechanism incorporating a position marking arrangement in accordance with the invention;

FIG. 3 is a diagrammatic perspective view of part of the arrangement of FIG. 1;

FIG. 4 is a detail view illustrating a peg in a hole;

FIG. 5 is a cross-section through an alternative form of one component of the invention; and FIG. 6 is a lower view of the peg of FIG. 4.

DESCRIPTION OF PREFERRED EMBODIMENTS

FIG. 1 shows a vehicle seat with a seat cushion 10 and a backrest 12. The seat is supported on a seat slide mechanism, generally indicated at 14, which comprises a static slide 16 and a movable slide 18. The static slide 16 is fixed to the floor of the vehicle and the movable side 18 is fixed to the underside of the seat cushion 10.

The seat can move forward and backward on the static slides 16, and can be latched in any one of a variety of positions by means of any conventional seat slide latching mechanism. Details of this mechanism are not shown in the drawings because they will be familiar to the person skilled in the art and that latching is relevant only insofar as discrete positioning is effected as shown in the drawings.

FIG. 2 shows a section through a seat slide arrangement with the static slide 16 and a moving slide 18. The latching mechanism has been omitted from this view, for clarity. To improve the appearance of the car interior, it is conventional to fit seat track covers to both the moving and static slides, and these covers have both an aesthetic purpose and also serve to prevent fingers getting trapped in the slide mechanism. In FIG. 2, the moving slide has a slide cover 20 and the static slide 16 has a track cover 22.

At one point along the length of the slide cover 20, a datum mark 24 is provided. Where the cover 20 is a plastic molding, the datum mark 24 can conveniently be an integral part of the molding. This mark is shown in more detail in FIG. 3. The flat crest 26 of the mark can be painted white to clearly identify it if desired.

FIGS. 2 and 3 also show holes in the cover 22 for the static slide 16 for receiving marker pegs. These holes are indicated by reference numeral 28, and it will be seen that there is a row of these holes parallel to the displacement track of the datum mark 24.

A typical car seat is able to slide forward and backward over a total range of about 210 mm. Over such a range, there may be equally spaced holes 28, which will thus be about 15 mm apart. Each hole will be associated with a 'latched' position of the seat slide mechanism.

In FIG. 3, a marker peg 30 is shown inserted into one of the holes 28. This peg will have a large head and will be of a prominent color so that it will be easy for a driver entering the vehicle to see whether the datum mark 24 is lined up with the peg 30 of "their" color. If it is, then the seat is in the correct position for them. If it is not, then they will wish to move the seat forward or backward to line up the datum mark 24 with the peg which they have placed in the correct position for them and to latch the seat in that position.

Each peg 30 preferably has a large head 32 and a stem 34 which is a tight, push-fit in the hole 28. Once the peg is placed in the hole, it should be a tight fit there so that it will not be dislodged accidentally. On the other hand, however, it should be possible to withdraw the peg 30 to put it in a different position, without destroying the peg 30 or the track cover 22, and without the use of tools. To this end, a spacer web 36 can be provided beneath the head 32 so that it is possible to place the tips of fingers under the head 32 when the peg is to be withdrawn.

Because some cars will be driven by only one driver, it may be desirable to form the holes 28 in such a way that they are only uncovered when they are required for use, and FIG. 5 shows a cross section through an alternative track cover 22a where the holes 28a are initially blocked by an integrally molded plug 38 connected to the rest of the cover by easily breakable webs 40. The slight depression in the upper face of the cover 22a indicates where a peg may be placed and when a peg is placed in a hole for the first time, the plug 38 will be broken away from the cover, and that hole will thereafter be open (except when it is actually occupied by a peg 30).

The arrangement may also include additional holes of the same diameter as the holes 28, but positioned in another part of the seat or its framework where pegs which are not in use can be "parked".

The invention provides a very cheap and simple way of indicating the position to which a seat is to be adjusted, and enables settings previously found to be comfortable to be reset quickly and easily. In particular, it is possible with this system for a temporary driver of somebody else's vehicle to quickly and easily reset the seat to the position in which they found it, upon exiting the vehicle.

We claim:

1. A position marking arrangement in a seat mounted in a motor vehicle and slidably, longitudinally positionable between a plurality of discrete positions, the seat having a first component fixedly secured to the vehicle and a second component slidably mounted therein for movement between said positions, the position marking arrangement comprising:

means defining a datum mark on one of said components;

means defining a plurality of holes axially spaced along the other of said components and positioned to register with said datum mark at each of said positions; and a plurality of marker plugs comprising differently colored pegs selectively engageable in said holes to identify relative position of said holes and said datum mark.

2. A position marking arrangement in a slidable vehicle seat in which the seat forms a first component which is slidable in an axial path relatively to a second component, wherein one of the first or second components has a datum mark thereon and the other of the first and second components has a surface such that relative movement takes place between the data mark and the surface when the seat slides, and wherein the surface has means for mounting a marker thereon in a range of different positions in the axial path of relative movement of said first and second components, said marker comprising differently colored pegs insertable into corresponding holes formed in said surface.

3. A position marking arrangement as in claim 2, wherein the datum mark is on the slidable seat, and the surface which carries the marker mounting means is on the second component.

4. A position marking arrangement as in claim 2, wherein the surface is part of a shroud which conceals a stationary element of the vehicle seat.

* * * * *